Figure 7:
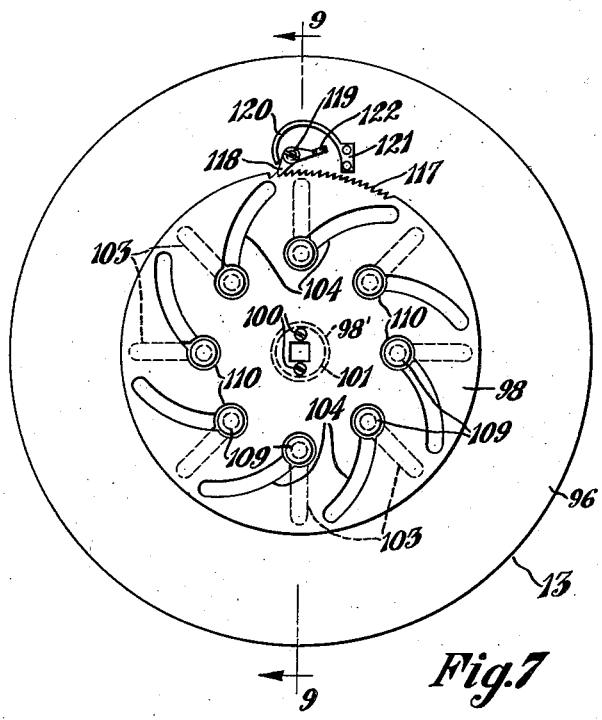

Dec. 5, 1939.  J. E. O. FELLER  2,182,723
FILM WINDING APPARATUS
Filed April 20, 1937   3 Sheets-Sheet 1
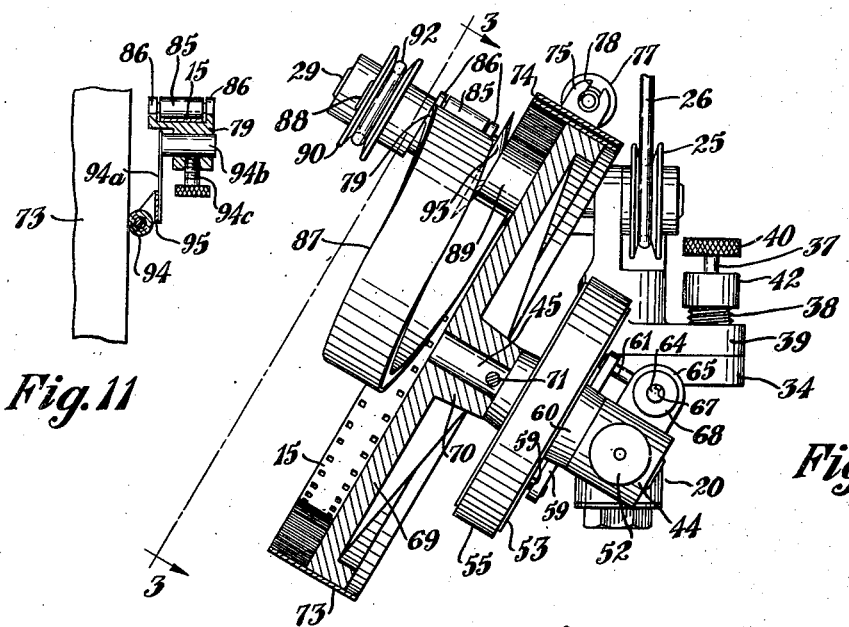
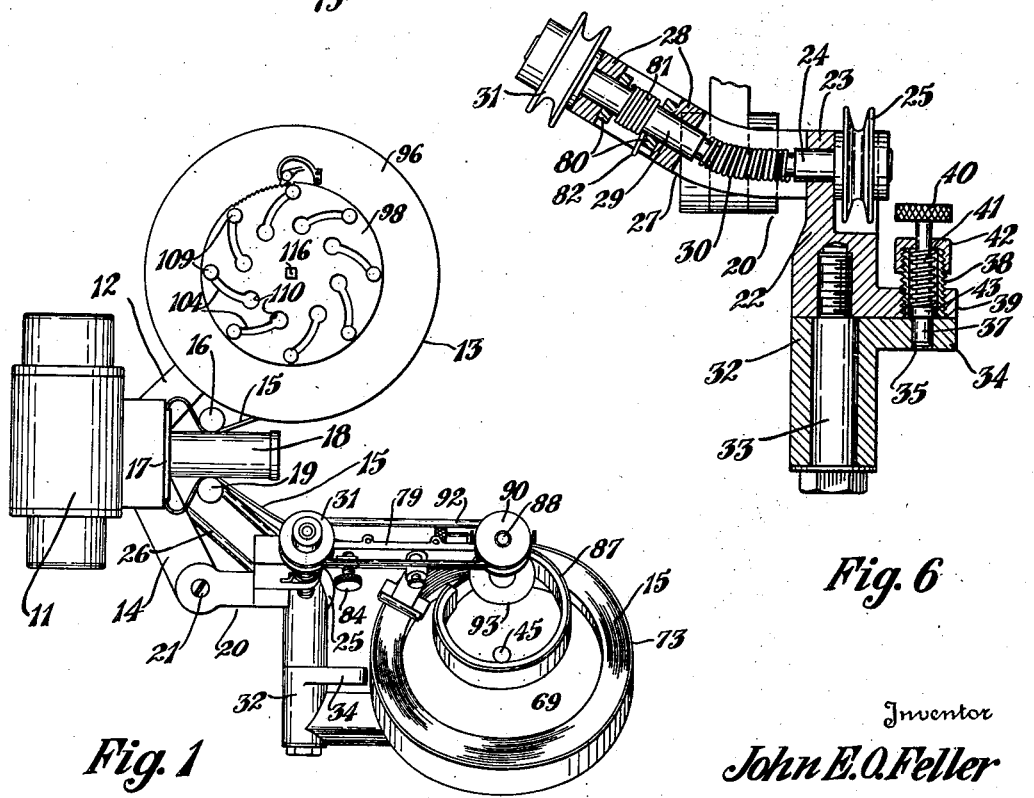
Inventor
John E. O. Feller Dec. 5, 1939.    J. E. O. FELLER    2,182,723
FILM WINDING APPARATUS
Filed April 20, 1937    3 Sheets-Sheet 2
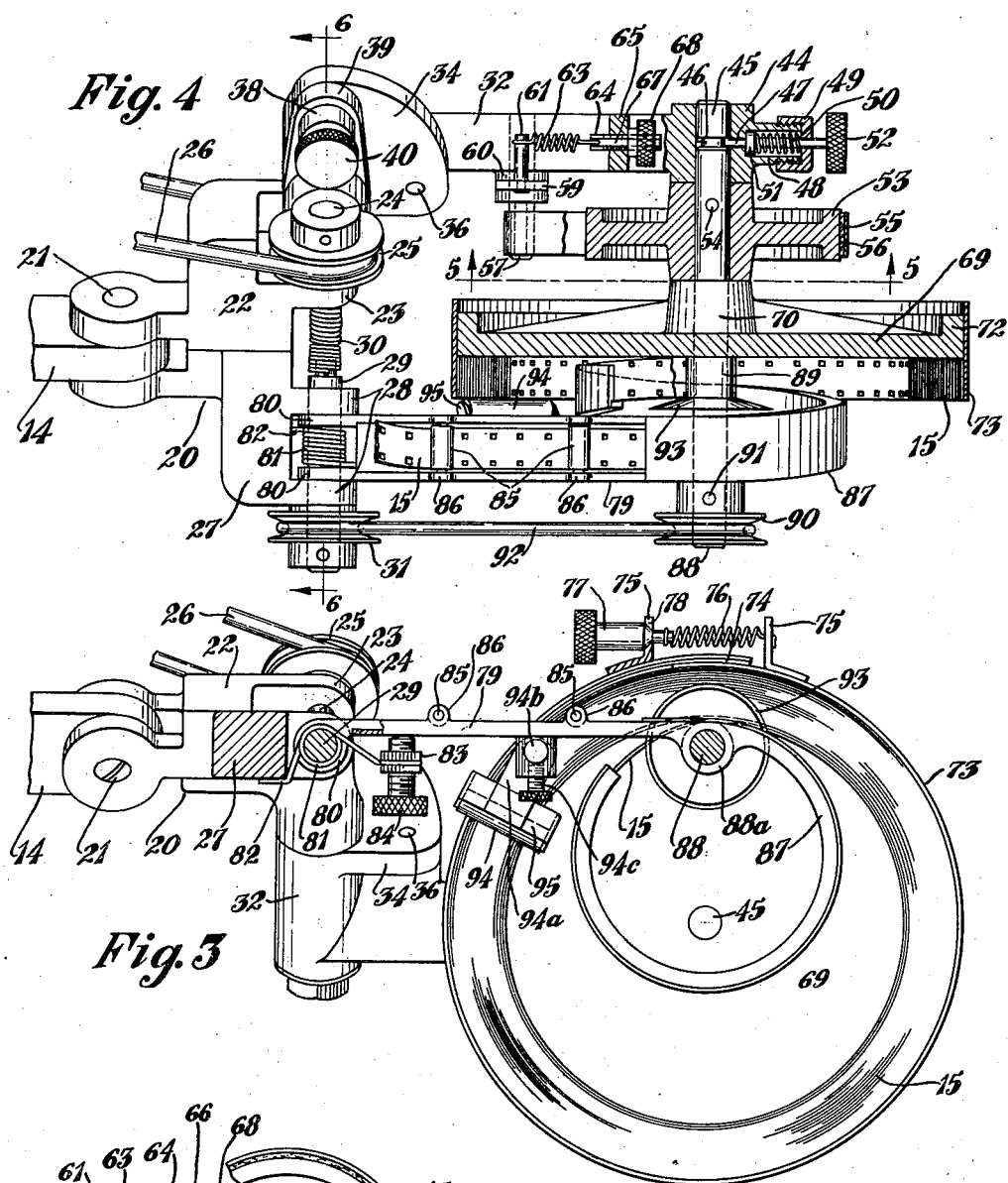
Inventor
John E. O. Feller Dec. 5, 1939.  J. E. O. FELLER  2,182,723
FILM WINDING APPARATUS
Filed April 20, 1937  3 Sheets-Sheet 3

Inventor
John E. O. Feller
By Frease and Bishop
Attorneys

Patented Dec. 5, 1939

2,182,723

UNITED STATES PATENT OFFICE 2,182,723

FILM WINDING APPARATUS

John E. O. Feller, Canton, Ohio

Application April 20, 1937, Serial No. 137,972

8 Claims. (Cl. 88—18.7)

The invention relates to mechanism for winding the film after it has been passed through a motion picture projector.

In present practice, after a film has been passed through a projector to exhibit the picture upon a screen, and before the film can again be exhibited, it must be rewound on another spool or reel so that the picture will be presented in proper progression upon the screen. This rewinding of the film is necessary because the film is withdrawn from the outside of the roll upon the feed spool or reel and rewound from the center of the receiving spool or reel.

It is known that attempts have been made to make this rewinding of the film unnecessary but the practice still prevails of rewinding the film from the receiving spool or reel before it is again exhibited in the projector.

The object of the present invention is to provide an attachment adapted to be connected to a motion picture projector of any usual construction to take the place of the usual receiving spool or reel, said attachment including a receiving drum and means for winding the film therein from the outside toward the center whereby the film is in position to be transferred to the feed spool or reel and again passed through the projector.

A further object is to provide such an apparatus in which the receiving drum is located at a considerable angle to the normal plane of the film so as to provide for easily winding the film therein and retaining the film against accidental displacement from the drum.

Another object is to provide a spiral guide member through which the film is guided into the receiving drum.

A further object is to provide a power driven roller for feeding the film from said spiral guide into the drum and at the same time rotating the drum at proper speed.

Another object is to provide a brake or drag upon the receiving drum with means for adjusting the tension thereon so that the drum will not overrun.

A still further object of the invention is to provide a novel feed spool or reel to which the rewound film may be transferred from the receiving drum, and having means for expanding the open center of the rewound coil or roll of film.

Figure 9:
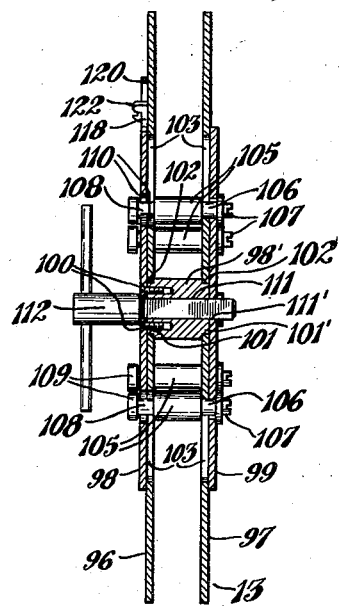
Figure 8:
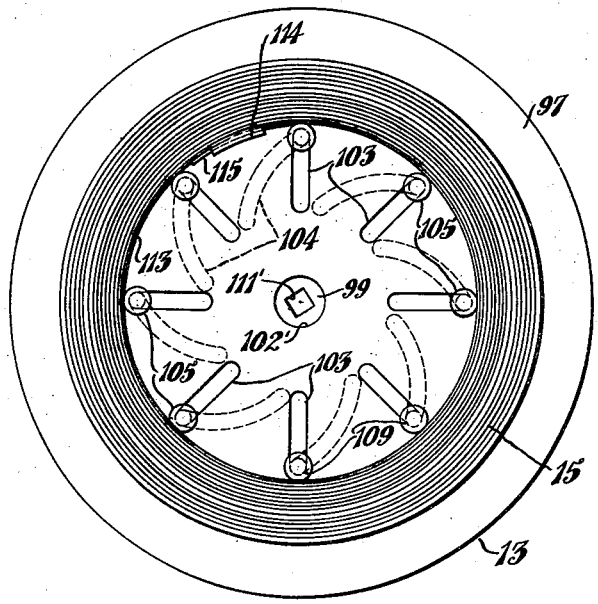
Figure 10:
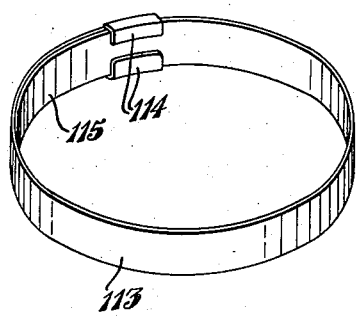

The above objects, together with others which will be apparent from the drawings and following description or which may be later referred to, may be attained by constructing the apparatus in the manner illustrated in the accompanying drawings, in which Figure 1 is a side elevation of a motion picture projector showing the improved film rewinding mechanism attached thereto;

Fig. 2, a front elevation of the rewinding mechanism on a larger scale, shown partly in section;

Fig. 3, a sectional elevation of the film rewinding mechanism taken as on the line 3—3, Fig. 2;

Fig. 4, a plan sectional view of the film rewinding mechanism;

Fig. 5, a section on the line 5—5, Fig. 4, showing the brake or drag mechanism for the receiving drum;

Fig. 6, a section on the line 6—6, Fig. 4;

Fig. 7, a side elevation of the improved feed reel or spool;

Fig. 8, an elevation of the feed reel or spool with one side plate removed showing a rewound film expanded therein;

Fig. 9, a section on the line 9—9, Fig. 7;

Fig. 10, a perspective view of the expanding ring used in the feed reel or spool; and Fig. 11, a detail cross sectional view through the channel guide, showing the tension adjusting mechanism for the guide roller.

Similar numerals refer to similar parts throughout the drawings.

A motion picture projector of usual and well known construction is indicated generally at 11 and provided with the usual upwardly disposed supporting bracket 12 upon which is journaled the feed spool or reel indicated generally at 13, and with the usual downwardly disposed supporting bracket 14 upon which the receiving spool or reel is usually carried.

The film indicated generally at 15 is withdrawn from the feed spool 13 in usual and customary manner, passing under the roller 16, then downward through the guide 17 located behind the usual projector lens 18 and thence over the pulley 19.

With the exception that the feed spool or reel 13 is an improved type of spool especially adapted for use in cooperation with the winding mechanism to which the invention pertains, all of the parts above referred to are of usual and ordinary construction in motion picture projectors now in common use.

The usual receiving spool or reel is removed from the supporting bracket 14 and a frame indicated generally at 20 is connected thereto as by the screw 21. The frame 20 has a substantially horizontally disposed portion 22 upon which is formed a bearing lug 23 in which is journaled a short shaft 24 having a pulley or the like fixed thereon as shown at 25 for connection to the usual belt 26 driven in usual and well known manner by mechanism within the projector and ordinarily used to drive the receiving reel or spool. An angular portion 27 is provided upon the frame 22 and provided with spaced bearing lugs 28 through which is journaled a shaft 29 connected by a flexible shaft 30 with the shaft 24, and having at its outer end a pulley 31.

A bracket arm 32 is pivotally connected to the frame 22 as indicated at 33 and provided with a segment 34 having spaced apertures 35 and 36 for alternate reception of the spring pressed plunger 37 which is carried within a housing 38 mounted upon the lug 39 formed upon the frame 22. A knurled head 40 may be provided at the outer end of the plunger for operating the same to compress the coil spring 41 between the head 42 of the housing and the shoulder 43 of the plunger.

A bearing boss 44 is formed upon the free end of the bracket arm 32 and the shaft 45 is journaled therein, said shaft being preferably provided with a peripheral groove 46 into which is received the end of the plunger 47 located in a housing 48, formed upon said boss, and having a cap 49, a spring 50 being coiled around the plunger and interposed between the shoulder 51 thereon and the cap 49 to normally urge the end of the plunger into the groove 46. A knurled head 52 may be mounted upon the plunger for manually releasing the same from the groove 46.

A brake or drag wheel 53 may be fixed upon the shaft 45 as by the pin 54 and a brake band 55 surrounds the friction surface 56 of the wheel. One end of the brake band may be fixed to a stud 57 mounted upon the bracket arm 32 and the other end thereof may be fixed to a stud 58 mounted upon one end of a lever 59 which is fulcrumed intermediate its ends upon a boss 60 formed on one side of the bracket arm 32.

The other end of the lever may have a stud 61 fixed thereto to which is connected one end of a coil spring 63, the other end thereof being connected to a screw 64 slidably mounted through a lug 65 formed upon the bracket arm 32. The screw 64 is held against rotation as by a pin 66 engaged in a longitudinal slot 67 in the screw and a nut 68 is provided upon the screw for adjusting the tension upon the spring 63.

The receiving drum may include the disk 69 having a hub 70 fixed upon the shaft 45 as by the pin 71, and provided with the peripheral flange 72 upon its rear face. A split spring ring 73 having its ends overlapped as indicated at 74 surrounds the disk 69 and extends forwardly beyond the front face thereof a sufficient distance to provide a chamber to receive the film.

An ear 75 may be welded or otherwise attached to the outside of the ring 73 near each end thereof, a coil spring 76 being connected at one end to one of said ears and at its other end to a headed pin 77 received in a slot 78 in the other ear whereby the spring 76 may be quickly and easily disconnected to permit opening of the ring 73 to remove the same from the disk.

A channel-shaped film guide 79 is provided at one end with depending ears 80 by means of which it is pivotally mounted upon the short shaft 29. For the purpose of urging this channel guide in a counterclockwise direction around the shaft 29, a coil spring 81 is located around the shaft 29, one end thereof being engaged under the portion 27 of the bracket frame as indicated at 82, the other end thereof being connected to a nut 83 through which is located an adjusting screw 84 contacting the underside of the channel guide 79 for varying the tension of the spring upon said channel guide.

A pair of spaced rollers 85 may be journaled in ears 86 formed upon the upper edges of the side flanges of the channel guide 79 for retaining the film 15 within said channel guide as it is fed thereto from the roller 19. The channel guide terminates in a depending spiral guide 87 which may be closed upon all four sides and of sufficient interior dimensions to permit the film to pass therethrough.

A shaft 88 is journaled in depending ears 88a formed upon the spiral guide and has fixed upon its inner end a roller 89 having a soft friction surface which may be rubber, chamois, kid or the like, adapted to engage the film as it issues from the spiral guide 87 and roll the same around the inside of the receiving drum.

A pulley 90 is fixed upon the outer end of the shaft 88 as by the pin 91 and is connected as by the belt 92 with the driven pulley 31. With this construction it will be seen that the roller 89 withdraws the film from the spiral guide 87 and rolls it in a coil within the receiving drum, the roller at the same time rotating the drum at the proper speed to receive the film therein.

A frusto-conical flange 93 may be formed upon the outer end of the roller 89 to assist in guiding the film into the receiving drum, and for the purpose of assisting in retaining the coil of film within the drum, a roller 94 may be carried upon a bracket 95 supported by the guide means and bearing against the outer edge of the coil of film.

As shown in the drawings the bracket 95 may be mounted upon a spring 94a, fixed to the end of the adjustable rod 94b, which is slidably located through a suitable boss upon the guide 79, and adapted to be held in adjusted position as by the screw 94c. Thus the tension upon the spring 94a may be varied, so that the roller 94 not only assists in guiding and retaining the coil of film within the drum, but also acts as a brake or drag upon the drum, whereby, if desired, the brake means 55—56 may be dispensed with.

It will be seen that with this construction the film is transferred into the receiving drum in the same position it occupied upon the feed spool or reel so that it is not necessary to rewind the film before again exhibiting it in the projector.

For the purpose of the invention an improved feed spool or reel is provided to which the coil of film within the receiving drum may be bodily transferred without rewinding. This feed spool or reel is shown in detail in Figs. 7 to 10 inclusive of the drawings.

This feed spool or reel includes a pair of spaced side plates or disks 96 and 97, each of which has a smaller disk 98 and 99 respectively, concentrically rotatably mounted thereon. The disk 98 has a hub 98' centrally fixed thereto as by the screws 100, the adjacent end of the hub being reduced as at 101 to be rotatably received within the central opening 102 of the side plate or disk 96. The other end of the hub is reduced at 101' to be rotatably received in the central opening 102' of the side plate 97.

Each of the side plates 96 and 97 is provided with a plurality of radially disposed slots 103 and each of the smaller disks 98 and 99 is provided with curved slots 104. In the retracted condition of the reel or spool, the inner ends of the radial slots 103 of each side plate are adapted to register with the inner ends of the corresponding curved slots upon the corresponding smaller disk, as shown in Figs. 7 and 9.

A plurality of spacing pins 105 is carried by the side plate 97 and its disk 99, these spacing pins having reduced ends 106 received through the corresponding slots 103 and 104 of the plate 97 and disk 99 respectively, flange headed screws 107 being engaged in said reduced ends of the pins to retain them in position upon the side plate 97 and disk 99.

The opposite end of each of the pins 105 is reduced as at 108 to be received in the slots 103 and 104 of the side plate 96 and disk 98 respectively, and is provided with a head 109 adapted to be received through the enlarged openings 110 at the inner ends of said slots.

The hub 98' may be provided with a central squared socket 111, and the disk 99 has a squared opening 111', adapted to receive a squared tool 112 in the form of a clock key or the like for rotating the disks 98 and 99 relative to the side plates 96 and 97, whereby the spacing pins 105 will be moved from the retracted position at the inner ends of the slots 103 and 104, as shown in Fig. 7, to the expanded condition at the outer ends of said slots, as shown in Fig. 8.

When it is desired to transfer the coil of film from the receiving drum to the feed reel or spool, the bracket arm 32 may be swung upon its pivot to move the receiving drum away from the spiral guide 87 and roller 89. The split ring 113 illustrated in Fig. 10 of the drawings may then be placed within the open center of the coil of film.

It will be noted that one end of this ring has the inturned ears 114 beneath which the other end 115 of the spring is slidably mounted. This ring being of spring material will expand sufficiently to contact the open center of the coil of film. The coil of film with the ring therein may then be removed from the receiving drum and transferred to the feed spool or reel.

For this purpose the feed spool is moved to the contracted position and the side plate 96 and disk 98 are removed over the heads 109 of the spacing pins so that the split ring 113 may be placed over said spacing pins. The side plate 96 and disk 98 are then replaced and the tool 112 inserted in the socket of the hub 99 and turned in a direction to move the pins 105 outward through the slots 103 and 104 to the position shown in Fig. 8, expanding the ring 113 and the coil of film thereon sufficiently to properly retain the same upon the feed spool, which may then be transferred to the square shaft 116 of the projector.

For the purpose of holding the feed spool in expanded condition, one of the disks as 98 on the drawings may be provided around its periphery with ratchet teeth 117 adapted to be engaged by the pawl 118 pivoted as at 119 upon the corresponding side plate 96 and arranged to be urged into engagement with the ratchet teeth as by the spring 120, one end of which may be fixed upon the side plate 96 as at 121. A finger 122 may be provided upon the other end of the pawl for manually releasing the same when it is desired to retract the feed spool.

Although the invention is illustrated and described as applied to a motion picture machine for winding the film therefrom, it should be understood that it is also applicable for winding any kind of tape, either of fabric, metal or other material, where it is desirable to produce a coil of the tape of a predetermined outside diameter.

I claim:

1. Mechanism for winding a tape with the leading end outermost, including a rotatable drum having its axis on an angle to the horizontal and open on its upper side, a guide member pivoted at a point spaced from the drum and terminating in a spiral guide extending into the open side of the drum for delivering the tape to the interior of the drum, and a driven roller located adjacent to the end of the spiral guide for rotating the drum to coil the tape within the drum and having a frusto-conical flange engaging the edge of the tape for feeding the tape into the drum.

2. Mechanism for winding a tape with the leading end outermost, including a rotatable drum having its axis on an angle to the horizontal and open on its upper side, a guide member pivoted at a point spaced from the drum and terminating in a spiral guide extending into the open side of the drum for delivering the tape to the interior of the drum, and a driven roller for rotating the drum to coil the tape within the drum and having a peripheral frusto-conical flange at its outer end located adjacent to the end of the spiral guide for engaging the edge of the tape for feeding the tape into the drum.

3. In a motion picture projector having a feed reel and a supporting bracket for a receiving reel, a bracket frame mounted upon said supporting bracket in the place of the usual receiving spool, an arm hinged upon said frame and adapted to be held in adjusted position, a shaft journaled in the arm upon an axis angular to the horizontal and substantially at a right angle to the axis of said hinge, a receiving drum mounted upon said shaft, pivoted, spiral guide means for delivering the film from said feed reel to the interior of the drum, and means for coiling the film within the drum and simultaneously rotating the drum.

4. In a motion picture projector having a feed reel and a supporting bracket for a receiving reel, a bracket frame mounted upon said supporting bracket in the place of the usual receiving spool, an arm hinged upon said frame and adapted to be held in adjusted position, a shaft journaled in the arm upon an axis angular to the horizontal and substantially at a right angle to the axis of said hinge, a receiving drum mounted upon said shaft, a guide member pivoted upon said bracket frame and terminating in a spiral guide for delivering the film to the interior of the drum, and a driven roller located adjacent to the end of the spiral guide for coiling the film within the drum and simultaneously rotating the drum.

5. In a motion picture projector having a feed reel and a rotatable receiving drum, means for delivering the film from the feed reel to the interior of the receiving drum and rotating the drum for coiling the film with its leading end outermost, said feed reel comprising a hub and a spaced pair of side plates, one of the side plates being detachably connected to the hub, an expansible core in the feed reel adapted to receive the coil of film from the receiving drum, and means for locking said side plates together and expanding said core within said coil of film.

6. In a motion picture projector having a feed reel and a rotatable receiving drum, means for delivering the film from the feed reel to the interior of the receiving drum and rotating the drum for coiling the film with its leading end outermost, said feed reel comprising a hub and a spaced pair of side plates, one of the side plates being detachably connected to the hub, a disk rotatably connected to each side plate, each side plate having a plurality of curved slots therein, each disk having a plurality of radial slots therein, transverse pins located through the slots of each side plate and disk, an expansible core located around said pins for receiving the film from the receiving drum and means for rotating the plates and disks relative to each other to move the pins toward or from the center of the reel in order to expand or contract said expansible core.

7. In a motion picture projector having a feed reel and a rotatable receiving drum, means for delivering the film from the feed reel to the interior of the receiving drum and rotating the drum for coiling the film with its leading end outermost, said feed reel comprising a hub and a spaced pair of side plates, one of the side plates being detachably connected to the hub, a disk rotatably connected to each side plate, each side plate having a plurality of curved slots therein, each disk having a plurality of radial slots therein, transverse pins located through the slots of each side plate and disk, means for rotating the plates and disks relative to each other to move the pins toward or from the center of the reel, and a split spring ring adapted to be located within the coil of film and to be placed over said pins.

8. In a motion picture projector having a feed reel and a rotatable receiving drum, means for delivering the film from the feed reel to the interior of the receiving drum and rotating the drum for coiling the film with its leading end outermost, said feed reel comprising a hub and a spaced pair of side plates, one of the side plates being detachably connected to the hub, a disk rotatably connected to each side plate, each side plate having a plurality of curved slots therein, each disk having a plurality of radial slots therein, transverse pins located through the slots of each side plate and disk, an expansible core located around said pins, means for rotating the plates and disks relative to each other to move the pins toward or from the center of the reel for expanding or contracting said expansible core, heads upon the free ends of the pins, and enlarged openings at the inner ends of the slots in the removable side plate and its disk.

JOHN E. O. FELLER.